(12) United States Patent
Wilson et al.

(10) Patent No.: US 8,380,690 B2
(45) Date of Patent: Feb. 19, 2013

(54) AUTOMATING FORM TRANSCRIPTION

(75) Inventors: Jeffrey Kenneth Wilson, Austin, TX (US); Indran Naick, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 2274 days.

(21) Appl. No.: 10/650,904

(22) Filed: Aug. 28, 2003

(65) Prior Publication Data

US 2005/0050065 A1  Mar. 3, 2005

(51) Int. Cl.
  *G06F 15/16* (2006.01)
  *G06F 17/20* (2006.01)
(52) U.S. Cl. .................................... 707/705; 715/222
(58) Field of Classification Search .................. 707/705; 715/222
  See application file for complete search history.

(56) References Cited

U.S. PATENT DOCUMENTS

| | | | | |
|---|---|---|---|---|
| 5,204,821 A | * | 4/1993 | Inui et al. ...................... | 700/106 |
| 5,414,252 A | | 5/1995 | Shinoda et al. ................ | 235/463 |
| 6,012,067 A | * | 1/2000 | Sarkar ........................ | 707/103 R |
| 6,308,893 B1 | | 10/2001 | Waxelbaum et al. ..... | 235/472.01 |
| 6,539,370 B1 | * | 3/2003 | Chang et al. ....................... | 707/2 |
| 6,549,913 B1 | * | 4/2003 | Murakawa .................. | 707/104.1 |
| 6,552,719 B2 | * | 4/2003 | Lui et al. ........................ | 345/179 |
| 2002/0107863 A1 | * | 8/2002 | Hickey ........................... | 707/101 |
| 2003/0065643 A1 | * | 4/2003 | Musgrove et al. ................ | 707/1 |
| 2003/0084046 A1 | * | 5/2003 | Rogers et al. ................... | 707/10 |

* cited by examiner

*Primary Examiner* — John E Breene
*Assistant Examiner* — Alex Gofman
(74) *Attorney, Agent, or Firm* — David A. Mims, Jr.

(57) ABSTRACT

A system, computer program and method for automating form transcription. Data and meta data may be retrieved from a selected input form, e.g., W2 form. Data may refer to information, e.g., gross income, contained in a field in the input form. Meta data may refer to information, e.g., identifying fields in the input form, that describes or characterizes the data. The retrieved data and meta data may be correlated and stored in a database. Correlating may refer to identifying particular information in particular fields in the input form. The stored correlated data and meta for a selected input form may be mapped to a selected target form, e.g., 1040 form. Mapping may include mapping the data and meta data associated with particular fields in the input form to corresponding fields in the target form.

2 Claims, 11 Drawing Sheets

What forms do you
have to input?

| Form | Quantity |
|---|---|
| O  W2 | ☐ |
| O  1099 | ☐ |
| O  K-1 | ☐ |
| O  1098 | ☐ |

— 300

What forms do you
have to input?

| Form | Quantity |
|---|---|
| ◉  W2 | 2 |
| ◉  1099 | 4 |
| O  K-1 | ☐ |
| O  1098 | ☐ |

What method are you
using to input the forms?

O digital scanner
O digital camera
O bar code reader
O electronic import

— 400

What method are you
using to input the forms?

O digital scanner
[O] digital camera
O bar code reader
O electronic import

Please take a
picture of the form

FIG. 5

What type of form are
you preparing?

O 1040         O 11205
O Franchise Tax   O Estate Tax

— 800

What type of form are
you preparing?

◼ 1040         O 11205
O Franchise Tax   O Estate Tax

Select the forms you want to use.

Form

O W2-1
O 1099-1
O W2-2
O 1099-2
O 1099-3
O 1099-4

— 900

Select the forms you want to use.

Form

Do you want an
electronic form?

o    YES

Or, do you want to
print your form?

o    YES

⟵ 1100

Do you want an
electronic form?

o    YES

Or, do you want to
print your form?

▣    YES

AUTOMATING FORM TRANSCRIPTION

TECHNICAL FIELD

The present invention relates to the field of data processing systems, and more particularly to data processing systems that automatically transcribe information from one form to another form.

BACKGROUND INFORMATION

Many forms require information found on other forms and documents. Collecting and transcribing such information found on other forms and documents is both a time consuming task and subject to errors. One example is the personal tax return that requires information from W-2 forms, 1099 forms, and possibly many other forms. Other examples include loan applications, financial aid applications, and insurance claim forms.

Further, some forms are provided electronically, but are not in a format where the information can be automatically transferred to other forms. They typically must be printed, and the information on the printed forms transcribed to the desired form by hand.

Therefore, there is a need the art to automate form transcription thereby reducing time and errors.

SUMMARY OF THE INVENTION

The problems outlined above may at least in part be solved in some embodiments by correlating data and meta data retrieved from a selected input form, e.g., W2 form. Data may refer to information, e.g., gross income, contained in a field in the input form. Meta data may refer to information, e.g., identifying fields in the input form, that describes or characterizes the data. Correlating may refer to identifying particular information in particular fields in the input form. Upon correlating data and meta data from the selected input form, the correlated data and meta data may be mapped to a selected target form. Mapping may include mapping the data and meta data associated with particular fields in the input form to corresponding fields in the target form.

In one embodiment of the present invention, a method for performing form transcription may comprise the step of receiving input to select an input form. The method may further comprise receiving the input form using a selected input method. The method may further comprise retrieving data and meta data from the input form. The retrieved data and meta data may be correlated and then stored. The method may further comprise receiving input to select a target form. The method may further comprise mapping the correlated data and meta data to fields in the target form.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates an embodiment of the present invention of a graphical user interface depicting input forms displayed to a user of the data processing system;

FIG. 4 illustrates an embodiment of the present invention of a graphical user interface depicting the methods for inputting the input forms displayed to the user of the data processing system;

FIG. 5 illustrates an embodiment of the present invention of a graphical user interface depicting a response to input an input form using a selected method;

FIG. 8 illustrates an embodiment of the present invention of a graphical user interface depicting target forms displayed to the user of the data processing system;

FIG. 9 illustrates an embodiment of the present invention of a graphical user interface depicting input forms displayed to the user of the data processing system;

FIG. 11 illustrates an embodiment of the present invention of a graphical user interface depicting target form types displayed to the user of the data processing system.

DETAILED DESCRIPTION

Figure 1:
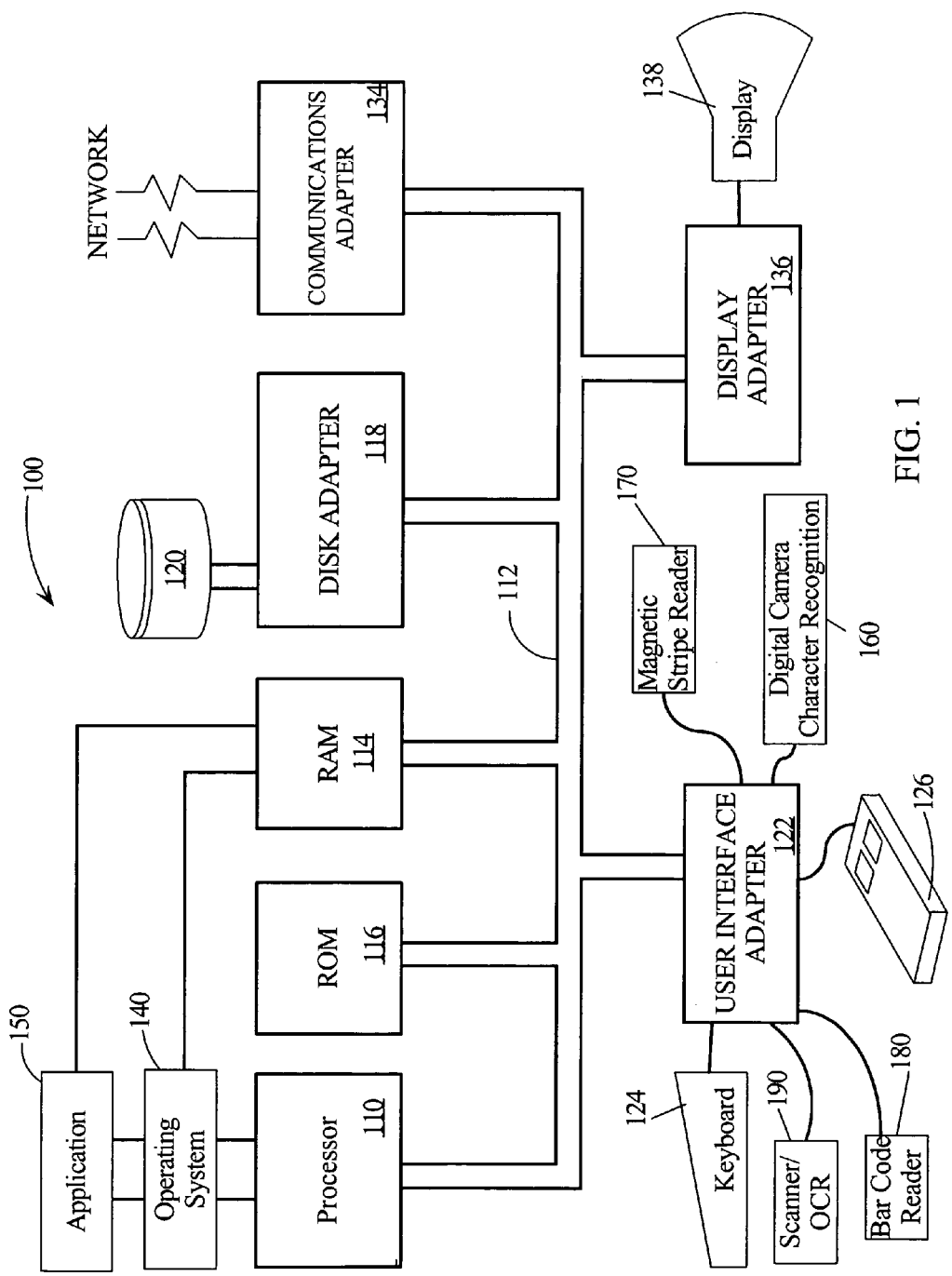
FIG. 1 illustrates an embodiment of the present invention of a data processing system.

The present invention comprises a system, computer program and method for automating form transcription. In one embodiment of the present invention, data and meta data may be retrieved from a selected input form, e.g., W2 form. Data may refer to information, e.g., gross income, contained in a field in the input form. Meta data may refer to information, e.g., identifying fields in the input form, that describes or characterizes the data. The retrieved data and meta data may be correlated and stored in a database. Correlating may refer to identifying particular information in particular fields in the input form. The stored correlated data and meta for a selected input form may be mapped to a selected target form, e.g., 1040 form. Mapping may include mapping the data and meta data associated with particular fields in the input form to corresponding fields in the target form.

In the following description, numerous specific details are set forth to provide a thorough understanding of the present invention. However, it will be recognized by those of ordinary skill in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art. Refer now to the drawings wherein depicted elements are not necessarily shown to scale and wherein like or similar views are designated by the same reference numeral through the several views.

FIG. 1 illustrates a typical hardware configuration of data processing system 100 which is representative of a hardware environment for practicing the present invention. System 100 may have a central processing unit (CPU) 110 coupled to various other components by system bus 112. An operating system 140 may run on CPU 110 and provide control and coordinate the functions of the various components of FIG. 1. An application 150 in accordance with the principles of the present invention may run in conjunction with operating system 140 and provide calls to operating system 140 where the calls implement the various functions or services to be performed by application 150. Application 150 may include, for example, a mapping/correlation engine configured to map/correlate information from one form to be used on another form as discussed in greater detail in conjunction with FIGS. 6 and 10, a program for automating the form transcription process as discussed in conjunction with FIG. 2. Read-Only Memory (ROM) 116 may be coupled to system bus 112 and include a basic input/output system ("BIOS") that controls certain basic functions of system 100. Random access memory (RAM) 114 and Input/Output (I/O) adapter 118 may also be coupled to system bus 112. It should be noted that software components including operating system 140 and application 150 may be loaded into RAM 114 which may be the computer system's main memory for execution. I/O adapter 118 may be a small computer system interface ("SCSI") adapter that communicates with a disk unit 120, e.g., disk drive. Disk unit 120 may include a database configured to store information such as what fields and field locations exist on each form that the program of the present invention is able to transcribe. The database may further be configured to store information such as what fields and field locations exist for each target form. The database may further be configured to store information about which input forms are required for each target form and how multiple input forms should be handled for the same target form. The database may further be configured to store information about which fields in which input forms are required to complete each field in a particular target form. The information stored in the database may be accessed by the mapping/correlation engine. It is noted that the database may be located in any type of non-volatile memory unit and that the database may be located separately from system 100. It is further noted that the mapping/correlation engine of the present invention as discussed in greater detail in conjunction with FIGS. 6 and 10 may reside in disk unit 120 or in application 150. It is further noted that the program of the present invention that automates the form transcription process as discussed in conjunction with FIG. 2 may reside in disk unit 120 or in application 150.

Referring to FIG. 1, system 100 may further comprise a communications adapter 134 coupled to bus 112. Communications adapter 134 may enable system 100 to communicate with other systems. I/O devices may also be connected to system bus 112 via a user interface adapter 122 and a display adapter 136. Keyboard 124, mouse 126, digital camera/character recognition unit 160, magnetic stripe reader 170, bar code reader 180 and scanner/optical character recognition unit 190 may all be interconnected to bus 112 through user interface adapter 122. Using either digital camera 160, magnetic stripe reader 170, bar code reader 180 or scanner 190, data and meta data from an input form may be inputted to system 100. An "input form" may refer to the form containing information used to complete a second form, referred to herein as a "target form." "Data", referred to herein, may refer to information, e.g., gross income, contained in a field in the input form. "Meta data", referred to herein, may refer to information, e.g., identifying fields in input form, that describes or characterizes the data. Meta data may be programmatic data that specifies details of the form and its individual elements. Thus, for example, a W2 form would have data that references perhaps abstract data about the form (an ID, where to obtain the form data, textual information about the form, instructions, etc.) as well as the list of individual form elements. Each form element itself may also have its own meta data (an ID, field label, minimum and maximum value lengths, data types, or perhaps even rules like rounding, upper/lower case, whether or not it is a required field, etc). Meta data may be implemented using, a non-proprietary, and self describing format like XML or XML Schema. Persons of ordinary skill in the art would appreciate that XML refers to the extensible Markup Language, a standardized, text-based markup language for data exchange, and XML Schema which are used to define and describe classes of XML documents. Schema constructs may be used to provide for the specification of implicit information such as default values. The specifications defining XML and XML Schema are promulgated by the W3C (World Wide Web Consortium). It is noted that the devices illustrated for inputting data and meta data from the input form into system 100 are illustrative and that other devices may be used to input data and meta data from an input form into system 100. It is further noted that such other devices would be recognized by an artisan of ordinary skill in the art. It is further noted that embodiments including such other devices would fall within the scope of the present invention.

Referring to FIG. 1, a display monitor 138 may be connected to system bus 112 by display adapter 136. Upon inputting data and meta data into system 100, a user of system 100 may receive output via display 138.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. These sets of instructions, in conjunction with system components that execute them may process conditional payment events in an electronic transaction system as described hereinabove. Until required by the computer system, the set of instructions may be stored as a computer program product in another computer memory, for example, in disk drive 120 (which may include a removable memory such as an optical disk or floppy disk for eventual use in the disk drive 520). Further, the computer program product can also be stored at another computer and transmitted to the users work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these in similar terms should be associated with the appropriate physical elements.

Note that the invention may describe terms such as comparing, validating, selecting, identifying, or other terms that could be associated with a human operator. However, for several of the operations described that form part of at least one of the embodiments, no action by a human operator is desirable. The operations described are, in large part, machine operations processing electrical signals to generate other electrical signals.

Figure 2:
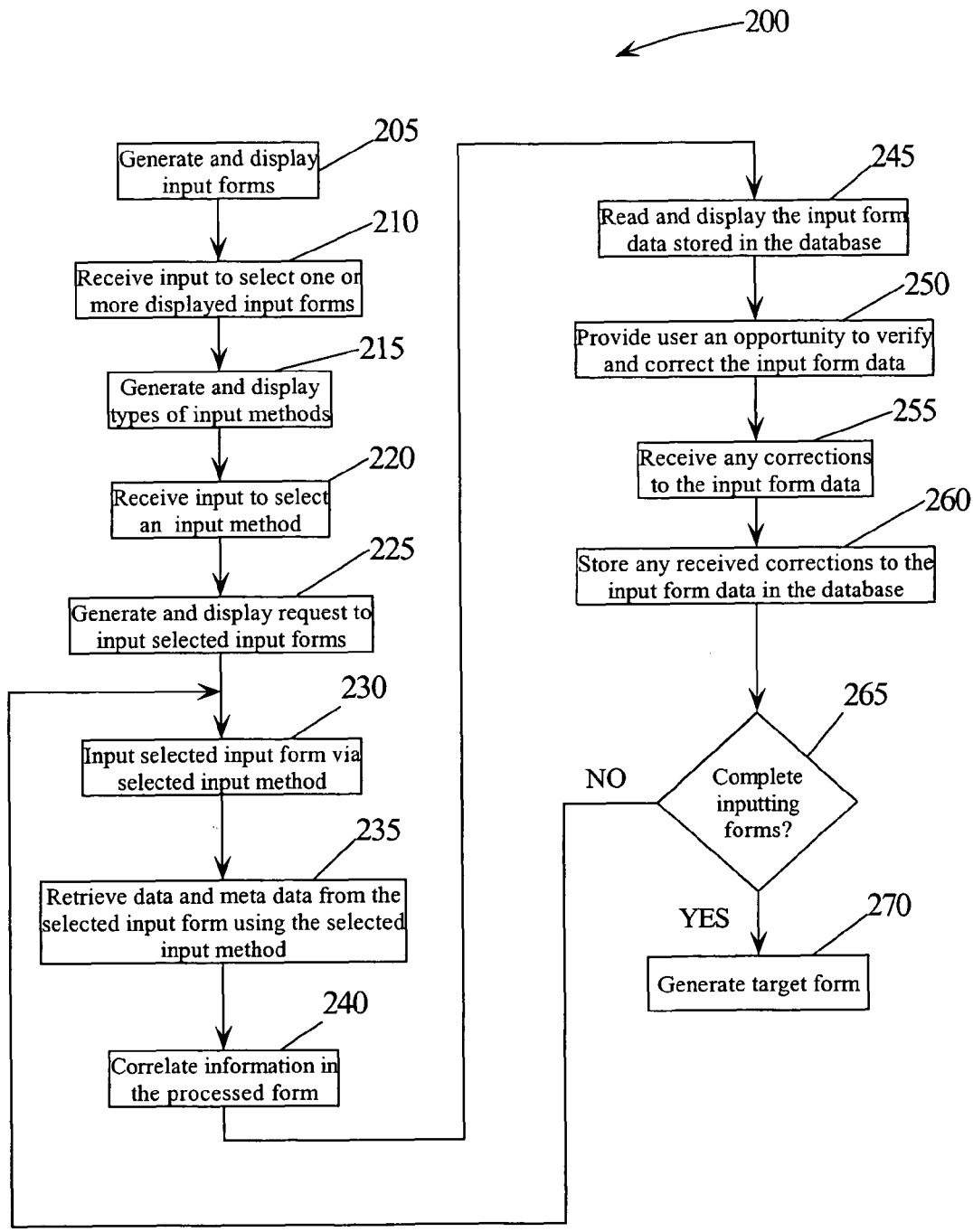
FIG. 2 is a flowchart of a method for automatically transcribing information from one form to another form in accordance with an embodiment of the present invention.

FIG. 2 is a flowchart of one embodiment of the present invention of a method 200 for automatically transcribing information from one form to another form.

Referring to FIG. 2, in conjunction with FIG. 1, in step 205, input forms are generated and displayed to a user of system 100 on display 138. In step 210, input is received from a user of system 100 as to which of the input forms displayed are to be transcribed as illustrated in FIG. 3. FIG. 3 illustrates an embodiment of the present invention of an exemplary graphical user interface (GUI) 300 depicting input forms displayed to the user of system 100 on display 138. FIG. 3 further illustrates an exemplary GUI 310 depicting the user selecting one or more input forms displayed by selecting one or more "radio" buttons.

Returning to FIG. 2, in conjunction with FIG. 1, in step 215, the types of input methods, e.g., convert input form from a physical format to a digital format, are generated and displayed to the user of system 100 on display 138. In step 220, input is received from the user of system 100 selecting a particular input method displayed. For example, the user may select the method of electronically converting the input form to a digital format if the input form is in a physical format and not in an electronic format. Many methods may be used to convert the input form to a digital format such as scanning the form, taking a picture of the form with a digital camera, reading a magnetic stripe or reading a bar code off the form. Steps 215 and 220 are illustrated in FIG. 4. FIG. 4 illustrates an embodiment of the present invention of an exemplary graphical user interface (GUI) 400 depicting the methods for inputting the input forms to system 100 displayed to the user of system 100 on display 138. FIG. 4 further illustrates an exemplary GUI 410 depicting the user selecting one of the methods displayed by selecting a radio button.

Figure 5:
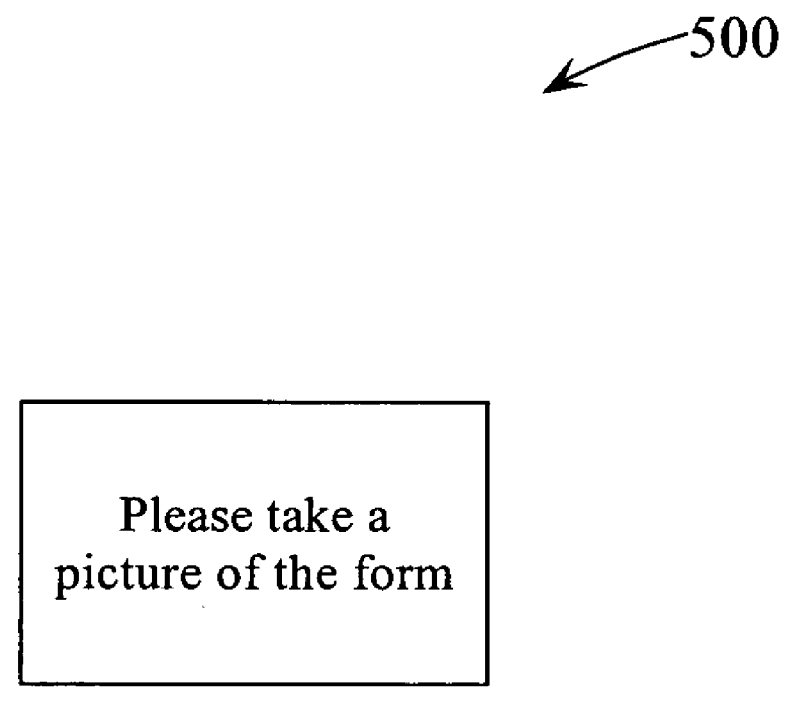

Returning to FIG. 2, in conjunction with FIG. 1, in step 225, a request to input the selected input forms using the selected method of inputting the input form is generated and displayed to the user as illustrated in FIG. 5. FIG. 5 illustrates an embodiment of the present invention of a GUI 500 depicting a request to input an input form using a selected method.

Returning to FIG. 2, in conjunction with FIG. 1, in step 230, a form, e.g., W-2 form, is inputted by the user using the selected input device, e.g., digital camera 160, magnetic stripe reader 170, bar code reader 180, scanner 190. It is noted that the user may input more than one form in step 230. It is further noted that the user may input one or more forms, e.g., W2 form, 1099 form, as they are received and then, at a later time, generate the target form, as described below. Alternatively, a user may input all the forms necessary to generate the target form at the time of generating the target form.

In step 235, data and meta data is retrieved from the selected input form using the method selected by the user in step 220. For example, an input form may be read using OCR 190. In step 240, the information, e.g., data in fields, in the processed form is correlated using the process discussed in FIG. 6. "Correlating", as used herein, may refer to identifying particular information in particular fields in the processed form using the meta data in the processed form as described below. For example, the salary in a field in a W2 form may be identified as a salary used to compute the individual's gross income on the 1040 form.

Figure 6:
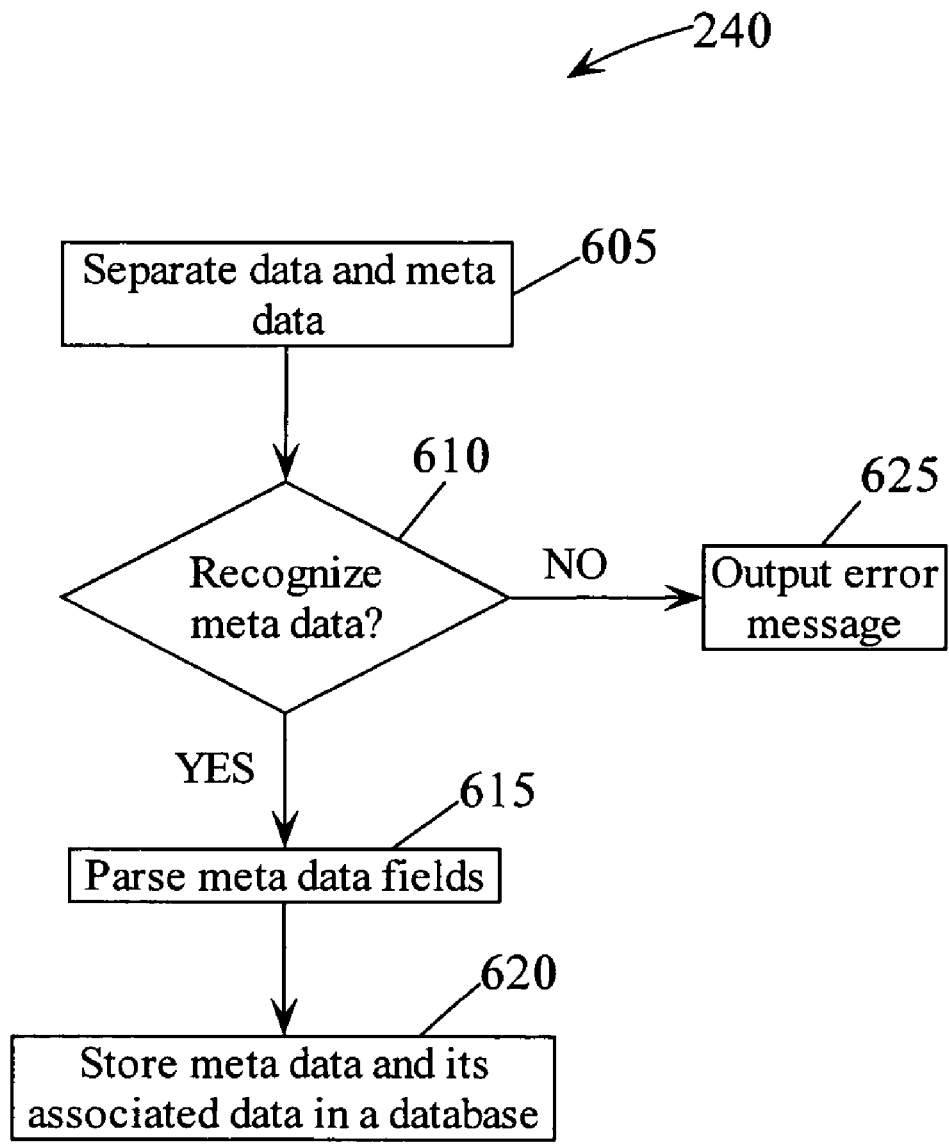
FIG. 6 is a flowchart of the sub-step of correlating the data and meta data in an input form in accordance with an embodiment of the present invention.

FIG. 6 is a flowchart of one embodiment of the present invention of a process 600 for correlating the form information, e.g., data in fields, in the processed form using the mapping/correlation engine.

In step 605, the data and meta data in the information in the processed form are separated. For each of the meta data in the processed form, the following steps are executed.

In step 610, a determination is made if the meta data is recognized. If the meta data is recognized, then, in step 615, the meta data fields are parsed. In step 620, the meta data and its associated data ("input form data") is stored in a database used to generate a target form as discussed below.

If, however, the meta data is not recognized, then, in step 625, an error message is displayed to the user on display 138.

It is noted that method 600 may include other and/or additional steps that, for clarity, are not depicted. It is noted that method 600 may be executed in a different order presented and that the order presented in the discussion of FIG. 6 is illustrative. It is further noted that certain steps in method 600 may be executed in a substantially simultaneous manner.

Returning to FIG. 2, in conjunction with FIG. 1, in step 245, the input form data stored in the database is read and displayed to the user on display 138. In step 250, the user is provided an opportunity to verify and correct the input form data. In step 255, any corrections to the input form data is received. In step 260, any received corrections to the input form data are stored in the database. If the input form contains "hard-coded meta data", the verification and correction step 250 may be bypassed because the hard-coded meta data is the most accurate input form data and need not be subject to potentially error prone manual editing. The user may have a final opportunity during target form generation to change the data.

In step 265, a determination is made as to whether the user has completed inputting all the input forms. If there are more forms to be inputted by the user, then the user inputs a form in step 230. It is noted that the user may input the other form at a later time when the other form is received. If there are no more forms to be inputted by the user, then a target form is generated in step 270 using the method described in FIG. 7.

It is noted that method 200 may include other and/or additional steps that, for clarity, are not depicted. It is noted that method 200 may be executed in a different order presented and that the order presented in the discussion of FIG. 2 is illustrative. It is further noted that certain steps in method 200 may be executed in a substantially simultaneous manner.

Figure 7:
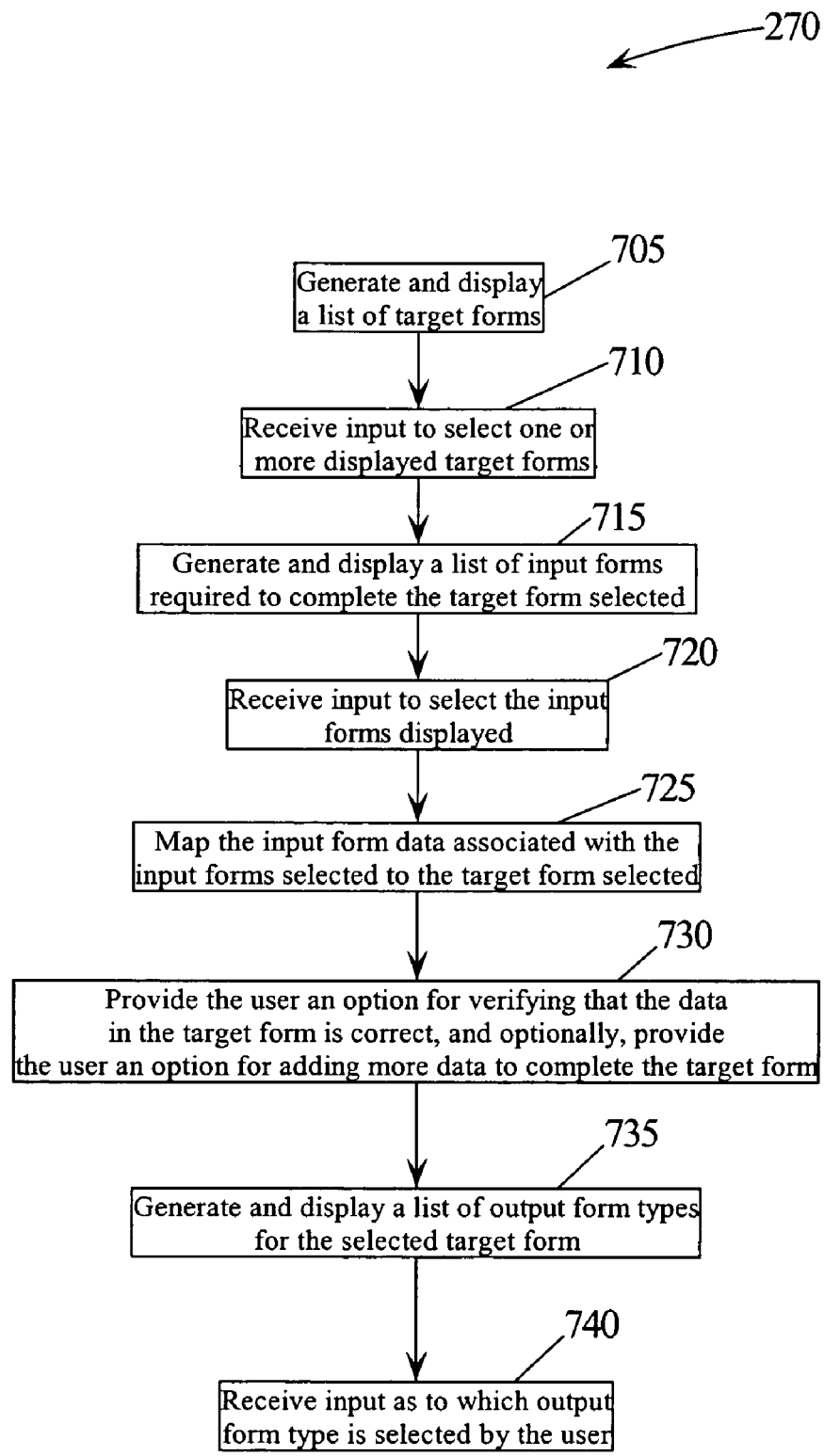
FIG. 7 is a flowchart of the sub-step of generating a target form in accordance with an embodiment of the present invention.

Referring to FIG. 7, FIG. 7 is a flowchart of one embodiment of a method 700 for generating a target form. Referring to FIG. 7, in conjunction with FIG. 1, in step 705, a list of target forms is generated and displayed to a user of system 100 on display 138. In step 710, input is received from a user of system 100 as to which of the target forms displayed are to be selected as illustrated in FIG. 8. FIG. 8 illustrates an embodiment of the present invention of an exemplary graphical user interface (GUI) 800 depicting target forms displayed to the user of system 800 on display 138. FIG. 8 further illustrates an exemplary GUI 810 depicting the user selecting a target form displayed by selecting a radio button.

Returning to FIG. 7, in conjunction with FIG. 1, in step 715, a list of input forms for the target form selected by the user in step 710 is generated and displayed on display 138. The list of input forms may be generated using the database containing information as to which input forms are required to complete a particular target form. In step 720, input is received from the user of system 100 selecting one or more input forms displayed. For example, the user may select the W2 (input form) as an input form used to generate the 1040 (target form). Steps 715 and 720 are illustrated in FIG. 9.

Referring to FIG. 9, FIG. 9 illustrates an embodiment of the present invention of an exemplary graphical user interface (GUI) 900 depicting input forms displayed to the user of system 900 on display 138. FIG. 9 further illustrates an exemplary GUI 910 depicting the user selecting the input forms displayed by selecting a radio button.

Figure 10:
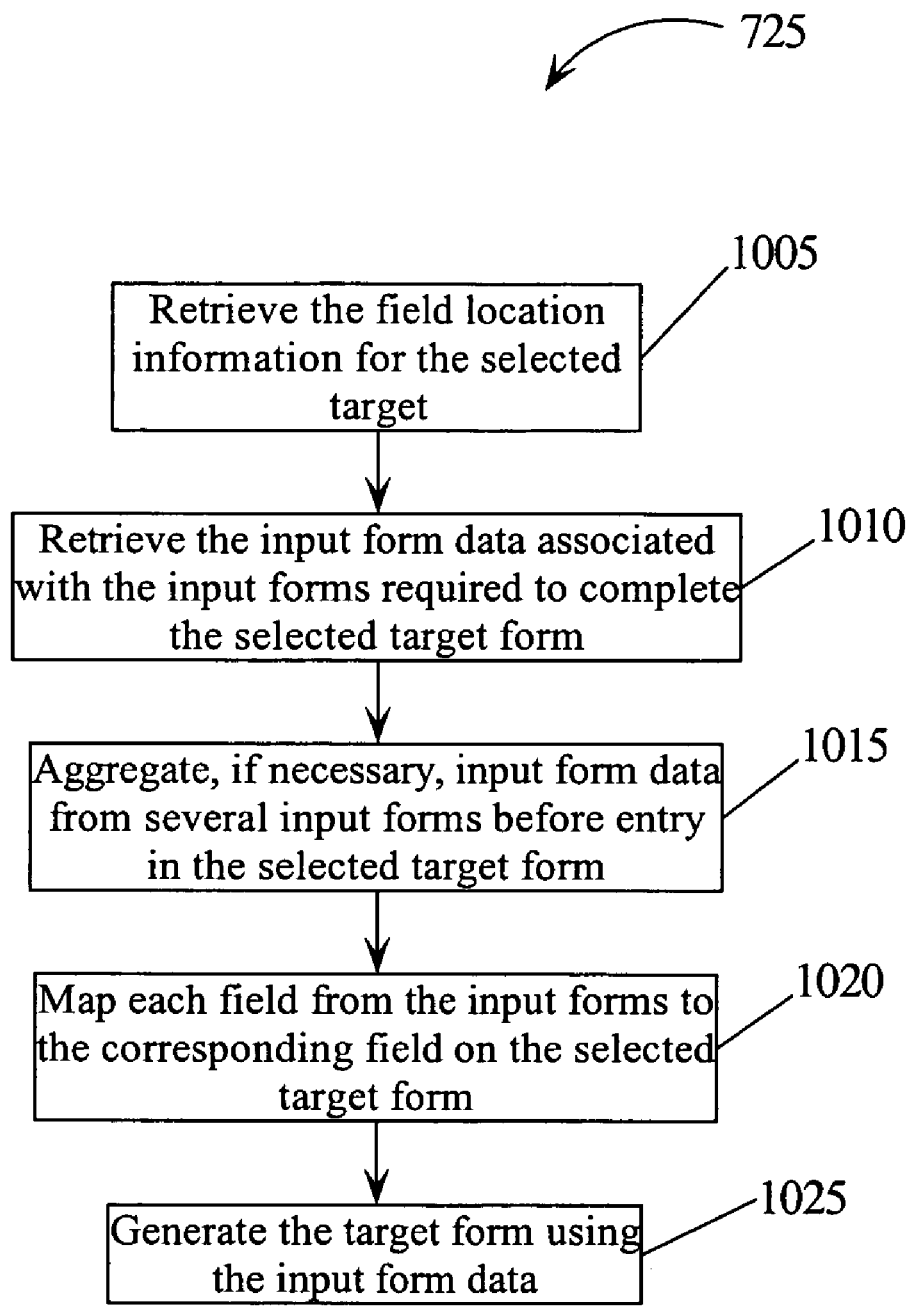
FIG. 10 is a flowchart of the sub-step of mapping correlated data and meta data associated with the input forms selected to a selected target form in accordance with an embodiment of the present invention.

Returning to FIG. 2, in conjunction with FIG. 1, in step 275, the input form data stored in the database that is associated with the input forms selected by the user in step 720 (FIG. 7) are mapped to the target form selected by the user in step 710 (FIG. 7) using a process, referred to herein as "mapping", as illustrated in FIG. 10.

It is noted that method 200 may include other and/or additional steps that, for clarity, are not depicted. It is noted that method 200 may be executed in a different order presented and that the order presented in the discussion of FIG. 2 is illustrative. It is further noted that certain steps in method 200 may be executed in a substantially simultaneous manner.

FIG. 10 is a flowchart of one embodiment of the present invention of a mapping/correlation engine for mapping the input form data stored in the database that is associated with the input forms selected to the selected target form. Referring to FIG. 10, in step 1005, the field location information for the selected target from is retrieved from the database. As stated above, the database may store field locations for the target form. In step 1010, the input form data is retrieved from the database associated with the input forms required to complete the selected target form. In step 1015, the input form data from several input forms is aggregated, if necessary, before entry in the target form. For example, the mapping/correlation engine may sum the gross income numbers from every W-2 input form selected before mapping that number to the gross income entry of the 1040 target form. In step 1020, each field from the input forms is mapped to the corresponding field on the target form in step 1020 using the information stored in the database. As stated above, the database may be configured to store information about which fields in which input forms are required to complete each field in a particular target form. In particular, the database may store the information as form meta data such as an XML document describing the target form. In step 1025, the target form is generated using the input form data. In step 1025, the mapping engine may insert meta data in the target form. The meta data may contain information to allow for easier processing of the form by including a form type and all of the data on the form. If a printed form is desired, the mapping engine may encode the meta data and print it on the form encoded, in bar code format, or another format. In this manner, the form may be processed automatically by another user.

It is noted that method 1000 may include other and/or additional steps that, for clarity, are not depicted. It is noted that method 1000 may be executed in a different order presented and that the order presented in the discussion of FIG. 10 is illustrative. It is further noted that certain steps in method 1000 may be executed in a substantially simultaneous manner.

Returning to FIG. 7, in conjunction with FIG. 1, in step 730, the user is provided an option for verifying that the data in the target form is correct, and optionally, is provided the option for adding more data to complete the target form. In step 735, a list of output form types for the selected target form is generated and displayed on display 138. In step 740, input is received from a user of system 100 as to which output form type is selected by the user as illustrated in FIG. 11. FIG. 11 illustrates an embodiment of the present invention of an exemplary graphical user interface (GUI) 1100 depicting target form types displayed to the user of system 1100 on display 138. FIG. 11 further illustrates an exemplary GUI 1110 depicting the user selecting the target form type displayed by selecting a radio button.

It is noted that method 700 may include other and/or additional steps that, for clarity, are not depicted. It is noted that method 700 may be executed in a different order presented and that the order presented in the discussion of FIG. 7 is illustrative. It is further noted that certain steps in method 700 may be executed in a substantially simultaneous manner.

Although the system, method and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

What is claimed is:

1. A method for performing form transcription comprising:
   receiving input to select one of a plurality of input forms to be transcribed;
   receiving said selected one of said plurality of input forms using a selected input method from a list of a plurality of input methods;
   retrieving data and meta data from said selected one of said plurality of input forms;
   correlating said data and meta data, wherein said correlating said data and meta data comprises:
      separating said data and meta data from said selected one of said plurality of input forms; and
      parsing said meta data;
   storing said correlated data and meta data;
   receiving input to select one of a plurality of target forms; and
   mapping said correlated data and meta data to fields in said selected one of said plurality of target forms, wherein said mapping said correlated data and meta data to fields in said selected one of said plurality of target forms comprises:
      retrieving field location information for said selected one of said plurality of target forms;
      retrieving input form data required to complete said selected one of said plurality of target forms;
      mapping each field from said selected one of said plurality of input forms to a corresponding field on said selected one of said plurality of target forms;
      generating said selected one of said plurality of target forms using said input form data;
      inserting said meta data in said selected one of said plurality of target forms, wherein said meta data contains information to allow for easier processing of said selected one of said plurality of target forms by including a form type and all of the data on said selected one of said plurality of target forms;
      encoding said meta data; and
      printing said encoded meta data on said selected one of said plurality of target forms in a bar code format.

2. The method as recited in claim 1, wherein said plurality of input methods comprises one or more of the following: scanning, reading a magnetic stripe, reading a bar code, and taking a picture with a digital camera.

* * * * *